United States Patent [19]

Struthers

[11] 4,390,602

[45] Jun. 28, 1983

[54] FUEL CELL

[76] Inventor: Ralph C. Struthers, 39503 Calle El Fuente, Saugus, Calif. 91350

[21] Appl. No.: 303,728

[22] Filed: Sep. 21, 1981

[51] Int. Cl.³ ............................................ H01M 8/04
[52] U.S. Cl. ...................................... 429/26; 429/38; 429/70; 429/101
[58] Field of Search ....................... 429/38, 39, 26, 70, 429/101

[56] References Cited

U.S. PATENT DOCUMENTS 3,657,015 4/1972 Veatch .............................. 429/38 X
4,069,371 1/1978 Zito ................................... 429/38 X
4,311,771 1/1982 Walther ................................ 429/51

Primary Examiner—Charles F. LeFevour

[57] ABSTRACT

An improved fuel cell comprising an anode section including an anode terminal, an anode fuel, and an anolyte electrolyte, a cathode section including a cathode terminal, an electron distributor and a catholyte electrolyte, an ion exchange section between the anode and cathode sections and including an ionolyte electrolyte, ion transfer membranes separating the ionolyte from the anolyte and the catholyte and an electric circuit connected with and between the terminals conducting free electrons from the anode section and delivering free electrons to the cathode section, said ionolyte receives ions of one polarity moving from the anolyte through the membrane related thereto preventing chemical equilibrium in the anode section and sustaining chemical reaction and the generating of free electrons therein, said ions received by the ionolyte from the anolyte release different ions from the ionolyte which move through the membrane between the ionolyte and catholyte and which add to the catholyte.

17 Claims, 9 Drawing Figures

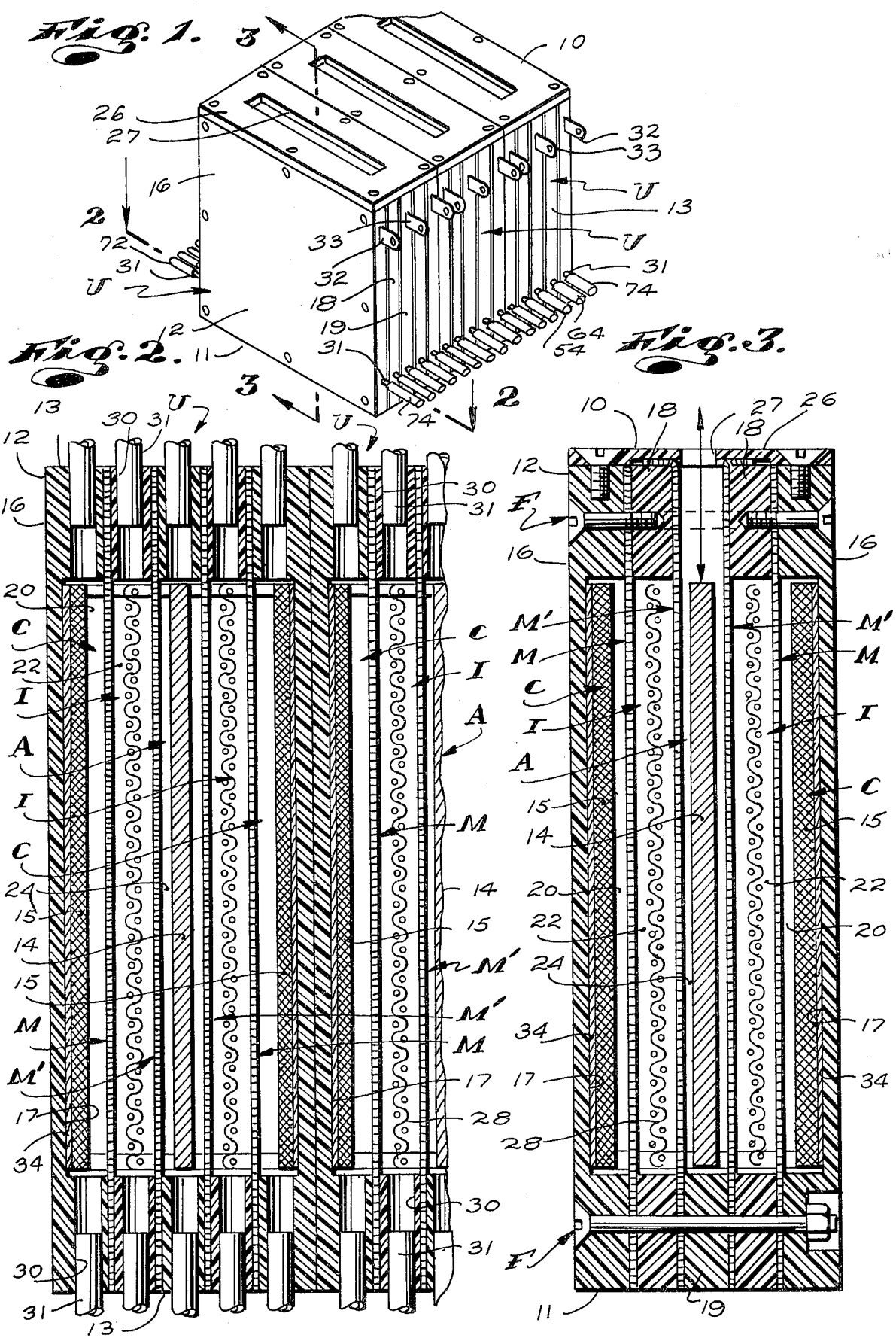

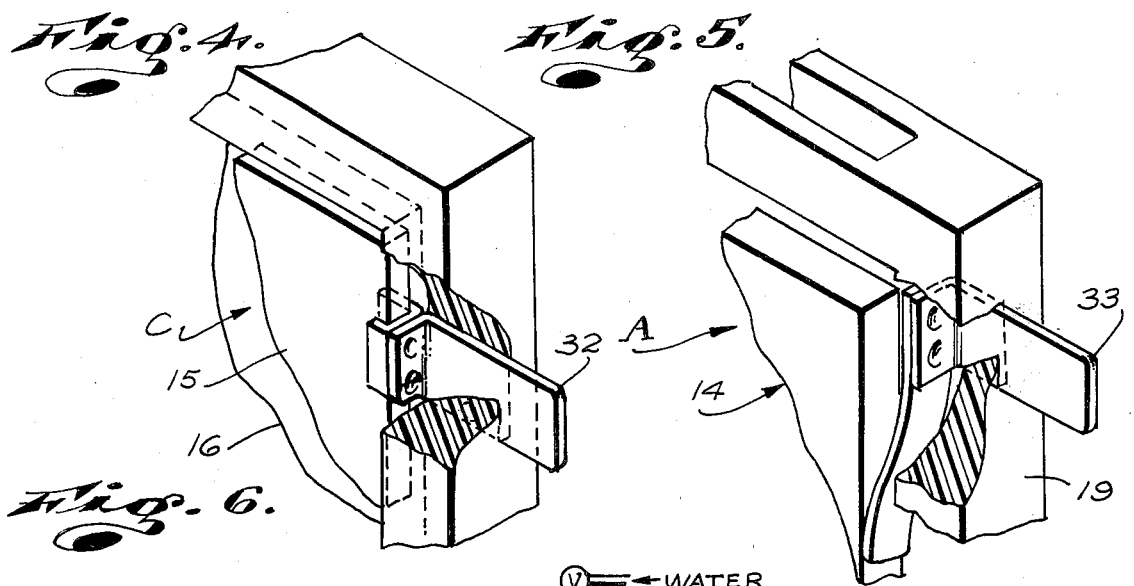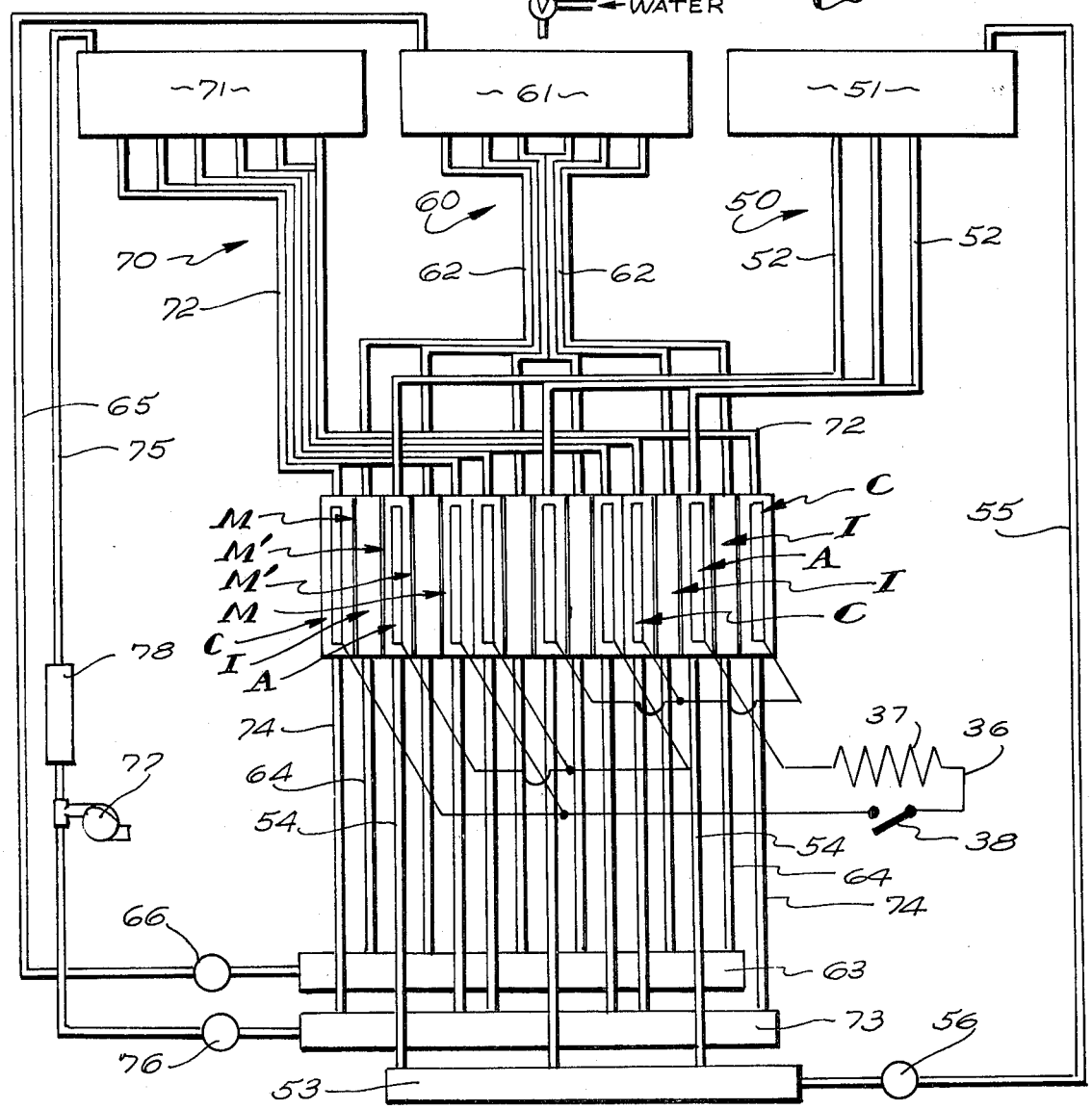

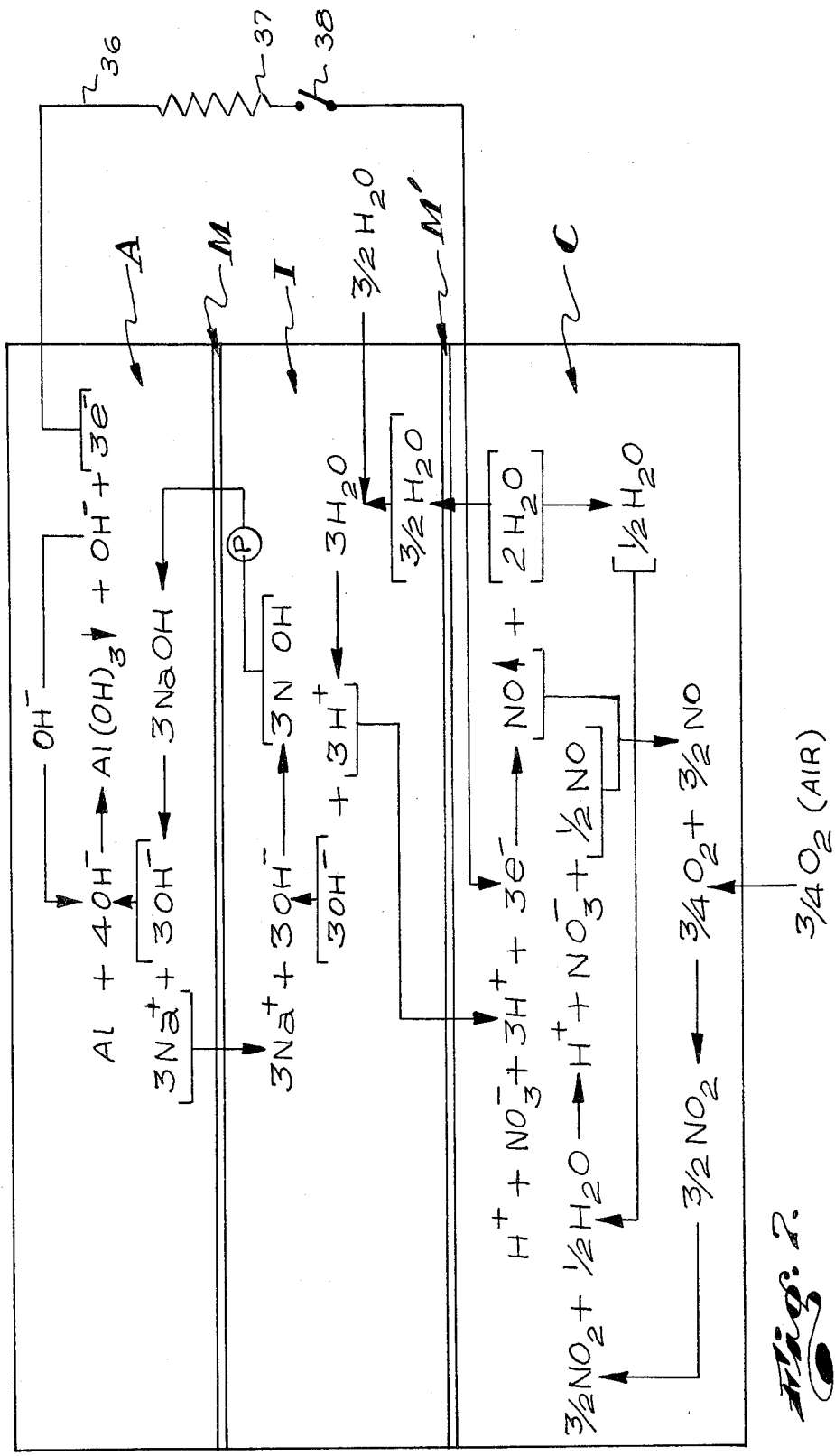

ANODE: $3N_2H_4 + 12OH^- \longrightarrow 3N_2\uparrow + 12H_2O + 12e$

CATHODE: $4NO_3^- + 16H^+ + 12e^- \longrightarrow 4NO\uparrow + 8H_2O$

CELL: $3N_2H_4 + 12OH^- + 4NO_3^- + 16H^+ \longrightarrow 3N_2\uparrow + 4NO\uparrow + 20H_2O$

~ REACTIONS ~

~ CELL NET REACTION ~

$3N_2H_4 + 3O_2 \longrightarrow 3N_2\uparrow + 6H_2O$

FUEL CELL

This invention has to do with fuel cells and is particularly concerned with a novel ion exchange fuel cell structure.

BACKGROUND OF THE INVENTION

The basic structure and operation of most fuel cells comprises spaced apart cathode and anode electrodes immersed in a common electrolyte. The cathode electrode is a free electron-receiving part of the cell and the anode is an electron generator part of the cell. In operation, an external circuit (in which a load is connected) is connected across the electrodes. If that circuit is open, chemical equilibrium is established within the cell structure and the cell is idle. When the circuit is closed, a current flow is established therein which results in the delivery of free electrons from the anode to the cathode. Free electrons at the cathode establish a chemical imbalance which results in a reaction with and between the cathode electrode and the electrolyte. That reaction results in ionization of electrolyte materials and the generation of positive and negative charged ions, such as hydroxyl ions. The negative hydroxyl ions are attracted by and move to the anode to react with the anode material. The reaction of the hydroxyl ions with the anode material generates free electrons and a by-product. The free electrons are connected into and through the external circuit to perform work and to continue to supply the cathode anode with free electrons and thereby sustain cell operation.

The cathodic, anodic and electrolyte materials in cells of the character referred to above must be carefully selected and can only be selected from a limited number of materials which are compatible and capable of sustaining effective and efficient cell operation. Further, the chemical reactions in the cells generally consumes the anode materials at a rapid rate and often consumes the cathode and/or the the electrolyte materials at a rate which is generally notably less than the rate at which the anode material is consumed. The chemical reaction also results in the generating and accumulation of by-product materials within the cells which must be suitably chemically neutral so as not to prematurely and adversely interfere with the chemical reaction necessary to maintain fuel cell operation. As a general rule, the by-products are and must be committed to waste.

As a result of the foregoing, the number of materials that can be combined to establish fuel cells which are effective, efficient and economical is extremely limited.

OBJECTS AND FEATURES OF MY INVENTION

It is an object of my invention to provide a novel fuel cell wherein more than one electrolyte is employed and which is such that the movement of ions between the electrolytes and the electrodes of the cell are managed and controlled whereby ions generated at one electrode and attracted to the other electrode are exchanged with ions of different and selected material which continue to move to with said other electrode.

An object and feature of my invention is to provide a novel fuel cell structure including anode and cathode sections containing anolyte and catholyte electrolytes, an intermediate ion exchange section containing an ionolyte electrolyte and ion exchange membranes between the sections separating the anolyte from the ionolyte and separating the ionolyte from the catholyte and through which ions of one polarity move from one electrolyte to a next adjacent electrolyte.

It is an object and feature of my invention to provide a fuel cell of the general character referred to above wherein chemical reaction and the generating of free electrons in the anode section is sustained by upsetting chemical equilibrium in the anode section by movement of ions from the anolyte through its adjacent membrane and into the ionolyte.

Yet another object and feature of my invention is to provide a fuel cell of the general character referred to above wherein chemical reaction in the catholyte section is sustained by upsetting the chemical equilibrium in the catholyte section by adding free electrons thereto and by adding ions from the adjacent ionolyte, which ions move through the membrane between the ion exchange and cathode sections. The above and other objects and feature of my invention will be fully understood from the following detailed description of typical preferred forms and embodiments of my invention throughout which description reference is made to the accompanying drawings.

DESCRIPTION OF THE DRAWINGS

FIG. 1 is an isometric view of a battery of cells embodying my invention;

FIG. 2 is an enlarged detailed sectional view taken as indicated by line 2—2 on FIG. 1;

FIG. 3 is an enlarged detailed sectional view taken as indicated by line 3—3 on FIG. 1;

FIG. 4 is an isometric view of a portion of the structure shown on FIG. 1;

FIG. 5 is an isometric view of another portion of my new structure;

FIG. 6 is a diagrammatic view of a support system for my new cell;

FIG. 7 shows the chemical formula and reaction of my cell;

FIG. 8 shows the net cell reaction; and

DETAILED DESCRIPTION OF THE INVENTION

Figure 9:
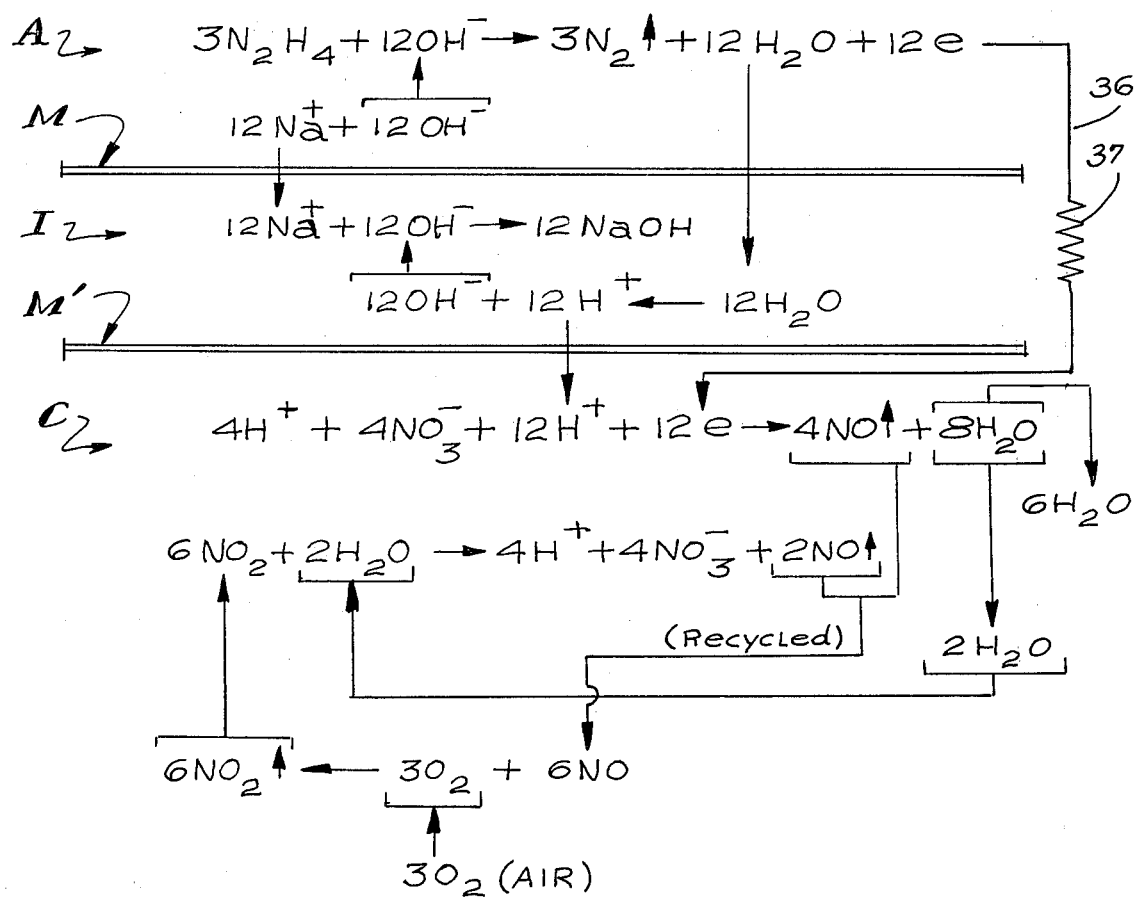
FIG. 9 shows the chemical formulation and reaction of another embodiment of my invention.

In FIG. 1 of the drawings, I have shown a battery of three modular fuel cell units U embodying my invention. The structural features and details of the units U are shown in FIGS. 2 through 4 of the drawings.

Each cell unit U is a rectangular block-like assembly having flat horizontal top and bottom sides 10 and 11, flat vertical outer sides 12 and flat vertical ends 13. Each unit U has a central anode compartment or section A intermediate the opposite sides of the unit and in which a flat vertically disposed anode fuel plate 14 is positioned, a pair of laterally spaced, outer cathode compartments or sections C in which flat vertical cathode plates 15 are arranged and a pair of intermediate ion transfer chambers or sections I, one occurring between each outer cathode section C and a related side of the central anode section A. The cathode sections C include substantially flat vertical, rectangular, outside end plates 16 of molded dielectric and chemically stable plastic with flat inside and outside surfaces and laterally inwardly opening recesses 17 in which the cathode plates 15 are suitably mounted. The ion sections I include vertical, rectangular frames 18 of molded dielectric and chemically stable plastic material with flat inside and outside surfaces and each is arranged with its outside surface in close opposing relationship with the inside surface of its adjacent related outside plate 16. The anode section A includes a flat, vertical, substantially rectilinear upwarldy opening U-shaped molded plastic frame 19 with flat oppositely disposed outside surfaces in close spaced opposing relationship with the inside surfaces of the frames 18 of the ion sections I. The anode plates 14 are freely positioned within the frames 19.

In addition to the outside plates 16 and frames 18 and 19, each unit U includes a pair of flat, rectangular outer cationic ion transfer membranes M arranged between the inner surfaces of the outside plates 16 and outside surfaces of the frames 18 and a pair of flat, rectangular, inner cationic ion transfer membranes M' between the outside surfaces of the frame 19 and their opposing inside surfaces of the frames 18. The outside plates 16, frames 18 and 19, and the membranes M and M' are securely held together in assembled relationship by screw fastener means F with the peripheral portions of the membranes M and M' in tight, clamped sealing engagement with and between their related plates and frames.

The outside membranes M overlie the recesses 17 in their related outside plates 16 to close the recesses and define fluid-tight cathode chambers 20 which are filled with and through which a suitable electrolyte or catholyte is circulated and in which the cathode plates 15 are immersed.

Each adjacent related pair of inner and outer membranes M and M' occurring at the opposite surfaces of the frames 18 close the opposite sides of those frames to define fluid-tight ion exchange chambers 22 which are filled with and through which a suitable electrolyte or ionolyte is circulated.

The two related and spaced apart inner membranes M' at opposite surfaces of the frame 19 overlie and close the opposite sides of the frame 19 to define a fluid-tight anode chamber 24 which is filled with and through which a suitable electrolyte or anolyte is circulated, and in which the anode plate 14 is immersed.

In addition to the above, and as shown in the drawings, the top surface 10 of the battery of cell units U is defined by a top or cover plate 26 screw fastened with the several units and which has three vertically opening slot-like openings 27 communicating with the anode chambers and through which the anode plates can be moved for servicing or replacement during operation of the cells.

Further, as shown, screen-like spacers 28 can be and are preferably arranged in the ion exchange chambers 22 to maintain the adjacent related pairs of membranes M and M' in spaced relationship with each other.

In practice, as shown, and as will hereinafter be described, the several end plates and frames going to make up each unit U are provided with pairs of fluid conducting ports 30. The ports 30 are provided with nipples or other suitable hose fittings 31. The ports 30, with their fittings 31, are arranged to facilitate the introduction and circulation of electrolytes into, through and out of the several chambers. In the case illustrated, the openings 30 enter the opposite ends of their related plates and frames and communicate with the lower portions of their related chambers.

Finally, each unit U includes cathode and anode terminals 32 and 33 to connect the plates 14 and 15 with a related external electric circuit 36. In FIGS. 4 and 5 of the drawings, I have shown two typical terminal structures 32 and 33 that can be advantageously employed in carrying out my invention.

In practice, when the cathode electrode plates 15 are established of carbon or some other frangible or delicate material, the plates can be provided with a suitable structurally stable reinforcing laminate, as shown at 34 in the drawings. In the form of cell structure illustrated, the laminates 34 are at the outer surfaces of the plates 15 and can be cemented or otherwise fixed to the opposing surfaces of the side plates whereby the plates 15 are securely held against displacement and/or working which might otherwise result in their fracturing or degradation.

It will be apparent that each cell unit U illustrated and described above is in fact a dual or double cell unit utilizing a single mode plate and that the battery shown in FIG. 1 is equivalent to a six cell battery.

In practice, the cathode and anode plates and the several electrolytes can be advantageously established of many different materials. For the purpose of this disclosure and for purposes of example, the fuel material of which the anode plates is made is aluminum. The cathode plates 15 are carbon, the anolyte in chamber 24 is sodium hydroxide (3 NaOH) (4 moller); the ionolyte in chambers 22 is also sodium hydroxide; and the catholyte in the chambers 17 is an aqueous solution of nitric acid ($H' + + NO_3$).

In furtherance of my invention and as diagrammatically illustrated in FIG. 6 of the drawings, I provide a support system S for effectively establishing and maintaining the fuel cell or cells in operation. The support system S first includes an external electric circuit 36 which is series connected with and between the terminals 32 and 33. The circuit 36 has a load 37 engaged therein and has an on and off switch 38 connected therein. It is to be understood and is believed to be apparent that the circuit 36 can vary widely in form and that the circuit shown is only an example of one form of circuit that might be used.

The support system S next includes an anolyte supply and circulating means 50; an ionolyte supply and circulating means 60 and a catholyte supply and circulating means 70.

The means 50, 60 and 70 include an anolyte supply tank 51, an ionolyte supply tank 61 and a catholyte supply tank 71. The several tanks 51, 61 and 71 are of sufficient size to hold volumes of anolyte, ionolyte and catholyte sufficient to fill and maintain circulation of those liquids in and through their several chambers in their related battery of cells.

Each anode, ion exchange and cathode compartment in the battery of cells is connected with its related supply tank 51, 61 and 71 by an elongate supply hose or line 52, 62 and 72 The separate lines 52, 62 and 72 extending between each compartment and its related tank, 51, 61 and 71 are sufficiently small in inside diameter and of sufficient length so that while they allow for effective flow of liquid, they afford sufficient resistance to prevent the flow of shunt currents from one end thereof to the other. In addition to preventing the flow of shunt currents, the noted lines also act or serve as heat exchangers and assure that the temperature of the liquids flowing therethrough will be at or very close to ambient temperature when they flow into the cells.

The system next includes anolyte, ionolyte and catholyte manifolds 53, 63 and 73 spaced from the battery of cells and discharge lines 54, 64 and 74 extending from each compartment 20, 22 and 24 to its related manifold 53, 63 and 73. The discharge lines 54, 64 and 74, like the lines 52, 62 and 72 are of sufficient longitudinal extent to serve as resistors which prevent the flow of shunt currents between related chambers of the cells and serve as heat exchangers to cool the liquids flowing therethrough and to dispose of any excess heat generated by chemical reaction in the cells.

It has been found that if the several delivery and discharge lines are $\frac{1}{4}$" Id plastic tubing and are in excess of 5 ft. long, the flow of shunt currents therethrough is effectively blocked and adequate cooling of the liquids is assured. In practice, the several noted elongate lines can be suitably coiled or otherwise arranged so that excessive space to accommodate them is not required and so that a neat and compact assembly of parts can be provided.

In practice, other shunt current blocking means and other cooling means can be provided instead of the extended or elongated fluid delivery and discharge lines noted above, without departing from the broader aspects and spirit of my invention. While such other or substitute means may be more conservative of space, they are not likely to be so simple, practical and as inexpensive as is the structure shown and described above.

The system S next includes return lines 55, 65 and 75 extending from the manifolds 53, 63 and 73 to their related tanks 51, 61 and 71. The lines 55, 65 and 75 can have suitable electric pumps 56, 66 and 76 engaged therein to effect the movement of liquid electrolytes from their related manifolds to their related tanks.

Instead of the pumps illustrated above, the manifolds can be replaced by holding tanks similar to the above noted supply tanks. When holding tanks are provided, the holding tanks and supply tanks can be intermittently elevated and lowered to effect transfer of liquids from the holding tanks to the supply tanks and effect flow from the supply tanks through the cells and to the holding tanks, as circumstances require.

Finally, the basic support system S includes aerating means to aerate and supply oxygen to the catholyte as it is recirculated and before it is introduced into the cathode chambers of the battery of cells. The means provided to aerate the catolyte might include a cascade type air scrubber arranged between the ends of line 75 or between the line 75 and tank 71, might include an aerator pump in the tank 71 or can, as shown, include an air pump 77 downstream of the pump 76 and delivering air into the upstream end portion of the line 75. The air pump might be a simple aspirator unit or can be an electric air pump, as desired or as circumstances require. In practice, if necessary, a scrubber 78, in the nature of a fiber packed filter unit, can be engaged in the lines 75 downstream of the pump 77 to assure adequate aeration of the catholyte by a minimum volume of air delivered thereto.

In practice, placement and the number of fluid openings 30 in the plates 16 and frames 18 and 19 of the fuel cell units can be varied and adjusted in many ways to assure proper flooding and uniform flow of electrolyte into, through and out of the several chambers of the cells. For example, it is preferred that the liquid be delivered into the bottoms of the compartments, at one end thereof and flooded or caused to flow upwardly in and across the compartments for discharge from the top and other ends thereof, whereby no air or gas is likely to become trapped therein and so that substantial uniform diagonal flushing of liquid across and through the compartments or chambers is assured. In the drawings I have elected to show a simplified arrangement of openings 30 in order to avoid illustrating details which might unduly complicate the drawings and cloud the invention.

When the above described preferred form and structural embodiment of my new fuel cell is in operation, that is, when the electric circuit 36 of the system S is closed and free electrons can and are caused to continue to flow to the cathode section C of the cell, the chemical reaction disclosed in FIG. 7 of the drawings takes place and a flow of current is established and maintained through the circuit.

To best describe the operation of each cell, those chemical reactions which take place in the anode, ion exchange and cathode sections A, I and C, should be given independent consideration. In accordance with the foregoing, considering the operation of the anode section A, it is to be first noted that the anode fuel is aluminum (A1) and the electrolyte or anolyte is sodium hydroxide (3NaOH). The anolyte is ionized and presents three positive sodium ions ($3N_a{}^+$) plus three negative hydroxyl ions ($3OH^-$). The positive charged sodium ions ($3N_a{}^+$) due to an imbalance in the adjacent ion exchange section I (to be later explained) move from the anode section A through the cationic membrane M separating the sections A and I. Similar movement of the hydroxyl ions ($3\ OH^-$) is blocked by the membrane M. As a result of the above, the remaining hydroxyl ions create an imbalance in the anode section and those ions are free to move and to react with the aluminum (Al). The reaction between the aluminum and hydroxyl ions results in the generating of a by-product of aluminum hydroxide ($Al(OH)_3I$) plus a free hydroxyl ion ($OH^-$) plus three free electrons ($3e$). The by-product, aluminum hydroxide, precipitates and is collected for disposal while the single free hydroxyl ion is recycled and combined with the three hydroxyl ions supplied by the anolyte. The three free electrons are conducted away, through the external circuit 36 to perform required work and are conducted to the cathode section to establish and maintain that chemical reaction which takes place in the cathode section. So long as the external circuit 36 is closed and the electrons flow, the above reaction will continue. It is only necessary that the supply of anolyte and aluminum be maintained and that the aluminum hydroxide precipitate be continually or periodically removed from the anode section A.

Next considering the chemical reaction in each ion exchange section I of the cell, the electrolyte or ionolyte is water ($3H_2O$) with sufficient sodium hydroxide (3NaOH) to enable ionization of the water and to thereby provide or present three negative hydroxyl ions ($3OH^-$) and three positive hydrogen ions ($3H^+$). The three hydrogen ions move from the ion exchange section into the cathode section C through the cationic membrane M' between the sections I and C to create a chemical imbalance in the section I. The remaining three hydroxyl ions in the section I which have moved from the anode section A into the section I are free and combine with the sodium ions therein to establish sodium hydroxide (3NaOH).

The water ($3H_2O$) in or of the ionolyte is made up of three halves supplied from the catholyte in the cell section C by absorption or hydration through the membrane M' and three halves are supplied from outside sources, as by adding water to the supply tank 61 of the support system S.

As cell operation continues, the concentration of sodium hydroxide in the ionolyte gradually increases and is such that when desired or when circumstances require, it can be withdrawn from the cell section I for disposal, but is preferably delivered and added to the anolyte for the cell section A, to replenish the supply of anolyte. The supply of ionolyte thus displaced is replenished by free water.

It will be apparent that so long as the cell is in its operating mode, sodium ions will continue to move from cell section A to cell section I, hydrogen ions will continue to move from cell section I to cell section C and that hydroxyl ions left to remain in section I will continue to combined with the sodium ions to establish sodium hydroxide, in the manner set forth above. Unless and until the flow of electrons from the cell section I to the cell section C is stopped, can or will the chemical imbalance associated with the reactions in cell sections A and I be disturbed and chemical equilibrium in the cell sections A and I be attainable.

Next considering the chemical reaction in the cathode section C of the cell, the cathode plate is a carbon electron distributor plate and the electrolyte or catholyte is, for example, an aqueous solution of nitric acid ($NO_3^-$) to which the three free electrons (3e) from the cell section A and the three hydrogen ions ($3H^+$) from the cell section I are added.

The basic chemical reaction in the cell section C is $H^+ + NO_3^- + 3H + 3e$, the product of which is $NO(-gas) + 2H_2O$. The first hydrogen ion ($H^+$) and nitrate ion ($NO_3^-$) are supplied by the collateral reaction $3/2NO_2 + \frac{1}{2}H_2O$, the product of which is $H^+ + NO_3^{--} + \frac{1}{2}NO$. The $3/2NO_2$ (nitrogen dioxide) is the product of another collateral reaction which is as follows: $\frac{3}{4}O_2$ (obtained from the air) $+ 3/2NO$ (nitric oxide gas) which combine to make nitric dioxide gas ($3/2NO_2$) in the product of the basic reaction and the nitric oxide ($\frac{1}{2}NO$) in the product of the first noted supplemental reaction. The $\frac{1}{2}H_2O$ of the first supplemental reaction is a part of the $2H_2O$ product of the basic cathode reaction (the other part of the $2H_2O$ is added to the ionolyte by absorption or hydration through the membrane M').

So long as the operating chemical imbalance in the ion exchange section I is maintained and the noted free hydrogen ions in that section continue to move to the cathode section or sections, the above cathodic reaction will continue and the cell will function to produce a current flow in the external circuit 36 between the anode and cathode sections.

The net reaction of the cell described above is $Al + 3/2H_2O + \frac{3}{4}O_2 \rightarrow Al(OH)_3I$. The net reaction is also set forth in FIG. 8 of the drawings.

It is to be noted that the nitric acid catholyte is maintained by the combining of hydrogen ions plus nitrate ions plus free electrons. Therefore, the ions from the ion exchange section into the cathode section must be hydrogen ions (not the sodium ions in the anolyte section A). The reaction in the catholyte section results in the production of nitric oxide gas and water as a by-product in the catholyte solution. To regenerate the catholyte solution, air is added to and scrubbed with the catholyte solution to combine oxygen with the by-product or nitric oxide gas to form nitrogen dioxide gas. The nitrogen dioxide gas is absorbed or combined with the water in the catholyte to make new nitric acid and to thereby replenish the catholyte.

In practice, the aluminum anode fuel can be replaced by most solid, metallic (electric conductor) fuels such as zinc, calcium, chromium, gallium, iron, lithium or magnesium and if desired, can be replaced by non-metallic conductive gaseous or liquid fuels such as hydrogen, methanol, methane, carbon monoxide, ammonium hydroxide, or hydrazine. The nitric catholyte can be established from various nitrates and of various acid materials such as sulphuric acid, hydrochloric acid and phosphoric acid.

The anolyte and ionolyte can be established of substantially any hydroxide and in some instances might be advantageously established of certain acid solutions. The several substitute materials noted above are not to be considered exclusive of possible substitutes but rather are intended to indicate the broad range of possible substitutes.

For the purpose of example, in FIG. 9 of the drawings, I have set forth the chemical reaction and the net cell reaction of a cell embodying my invention wherein the anode fuel is hydrazine. It will be apparent that the chemical reaction and/or operation of the cell with the noted dissimilar anode fuel is basically the same as in the first described cell in which the anode fuel was aluminum. In both examples, no ions move from the cathode section to the ion exchange section or from the ion exchange section to the anode section. Operation or function of the anode section is supported by negative ions or hydroxyl ions freed from the anolyte in the anode section by removing their related or balancing positive ions. Removal of the positive ions is effected by means of a cationic membrane between the anode sections of the cells and an adjacent, separate electrolyte or ionolyte wherein an imbalance of positive and negative ions is established which draws and/or causes positive ions of the the anolyte to move to and combine with negative ions in the ionolyte. In both cell structures, the imbalance of the positive and negative ions in the ionolyte is established and is maintained by the continuous movement of positive ions from the ionolyte to a next adjacent catholyte which, through a chemical reaction, establishes and maintains an imbalance of positive an negative ions which continuously attracts and/or draws positive ions from the ionolyte, through an intermediate cationic membrane. The imbalance in the cells is established and maintained by the removal of free electrons from the anode section and the addition thereof to the cathode section.

It is highly significant to note that in my invention, no negative ions (hydroxyl ions) move from the cathode sections to the ion exchange or anode sections and that the negative ions required in each section to maintain desired chemical reaction are generated therein and are retained and let to work therein. Further, the positive ions moving from the anode sections to the ion exchange sections do not move into the cathode sections, but remain in the ion sections and cause other or distinct positive ions (of different material) to move from the ion exchange sections to the cathode sections. In accordance with the foregoing, the positive ions advancing from the anode sections to the ion exchange sections effect an exchange with other positive ions in the ion exchange sections, displacing said other ions and freeing them for movement from the ion exchange sections to the cathode sections.

In the foregoing, I have described chemical formulas and reactions wherein the chemical reaction in the anolyte or anode section generates excess or extra positive ions and the chemical reaction in the ionolyte or ion exchange section is sustained by positive ions admitted to the ion exchange section through the cationic membrane between the anode and cathode sections. In practice, it is possible to adopt and use combinations of anode fuel, anolyte and ionolyte materials wherein extra negative ions are generated in the anode section and the chemical reaction in the ion exchange section is sustained by the addition of those extra negative ions generated in the anode section. In such a case, the membrane between the anode section and the ion exchange section is anionic rather than cationic, that is, it is established of material through which negative ions move substantially freely and which repel or stop the movement of positive ions through it.

While the combinations of anode fuel, anolyte and ionolyte materials suitable for use in carrying out my invention and which require the use of an anionic membrane between the anode and cathode sections are numerous and readily determinable, I have not found or determined if their exists a combination of ionolyte and catholyte materials which would require the movement of negative ions from the ion exchange section to the cathode section of my new cell to establish and maintain necessary operating chemical reaction therein. At this time, while I cannot discount the possibility that combinations of materials do exist which would require an anionic membrane between the ion exchange and cathode sections of my new cell, it is my present understanding that the chemical in the cathode section is necessarily corrosive in nature and requires the addition of positive ions in all cases and that the membrane between the ion exchange and cathode sections of my new cell is necessarily a cationic membrane. Further and comprehensive searching and testing of materials is likely to prove my above noted present understanding incorrect in whole or in part and that instances will be found where the membrane between the ion exchange and cathode sections of my new cell can be or must be anionic rather than cationic in nature.

As a result of the foregoing, the cathode and anode sections of my new cell structure are essentially isolated one from the other and the materials used in and supporting the chemical reactions in each of those sections has no direct effect on the materials used in and supporting the chemical reaction in the other section. Accordingly, the range of different materials that can be used in my new cell is materially greater than the range of materials that can be used in conventional fuel cells provided by the prior art. Such widening or increasing of the range of materials that can be used will necessarily enable those who practice my invention to select and to use combinations of materials which could not heretofore be used. The broadened range of materials will also enable those who practice my invention to select specific materials which will provide most effective, efficient and economical fuel cells for general or special uses.

Having described only typical preferred forms and applications of my invention, I do not wish to be limited to the specific details herein set forth but wish to reserve to myself any modifications and/or variations that might appear to those skilled in the art and which fall within the scope of the following claims:

Having described my invention, I claim:

1. A fuel cell comprising an anode section including an anode terminal, an anode fuel supply and an anolyte containing negative and positive charged anolyte ions, a cathode section including a cathode terminal, an electron distributing means and a catholyte containing negative and positive charged catholyte ions, an ion exchange section between the anode and cathode sections and including an ionolyte containing negative and positive charged ionolyte ions, a first ion transfer membrane between and separating the anolyte and ionolyte and a second ion transfer membrane between and separating the ionolyte and the catholyte, an electric circuit connected with and between the anode and cathode terminals conducting electrons from the anode section and delivering electrons to the cathode section, the anolyte is such that when certain anolyte ions of one charge are removed from it, remaining anolyte ions of the other charge react with the anode fuel to generate free electrons, the catholyte is such that when electrons are added to it, certain ionolyte ions of one charge move to combine with it, the ionolyte is such that said certain anolyte ions of one charge removed from the anolyte move to and combine with it and is such that when those anolyte ions are combined with it, those certain ionolyte ions of one charge are released by it, the first membrane allows movement of said certain anolyte ions of one charge through it, the second membrane allows movement of said certain ionolyte ions of one charge through it.

2. The fuel cell set forth in claim 1 wherein the second membrane is a cationic membrane and said certain ionolyte ions are positive charged ions.

3. The fuel cell set forth in claim 1 wherein the first membrane is a cationic membrane and said certain anolyte ions are positive charged ions.

4. The fuel cell set forth in claim 1 wherein the first membrane is an anionic membrane and said certain anolyte ions are negative charged ions.

5. The fuel cell set forth in claim 1 wherein the membranes are cationic membranes and said certain anolyte ions and ionolyte ions are positive charged ions.

6. A fuel cell including an anode section comprising an anode terminal, an anode fuel and an anolyte established of a first material and normally including a substantially balanced supply of positive and negative charged anolyte ions and such that when the supply of positive and negative charged anolyte ions is unbalanced, anolyte ions of one charge react with the anode fuel and generate electrons, an ion exchange section adjacent the anode section including an ionolyte established of a second material and normally including a substantially balanced supply of positive and negative charged ionolyte ions and such that when its supply of positive and negative charged ionolyte ions is unbalanced, anolyte ions of one charge will combine therewith and ionolyte ions of similar charge will release therefrom, a first membrane between and separating the anolyte and catholyte and through which anolyte ions of one charge which will combine with the ionolyte move to combine with the anolyte and through which anolyte ions of the opposite charge will not move, whereby the balance of the supply of positive and negative charged anolyte ions in the anode section is unbalanced, a cathode section adjacent the ion exchange section and remote from the anode section and comprising a cathode terminal, an electron distributor means and a catholyte established of a third material and such that when free electrons are added thereto, ionolyte ions of one charge will combine therewith, a second membrane between and separating the ionolyte and catholyte and through which those ionolyte ions which will combine with the catholyte move from the ionolyte to the catholyte and through which ionolyte ions of the opposite charge will not move and an external circuit connected with and between the anode and cathode terminals conducting electrons from the anode section and delivering electrons to the cathode section.

7. The fuel cell set forth in claim 6 wherein the second membrane is a cationic membrane and said certain ionolyte ions are positive charged ions.

8. The fuel cell set forth in claim 6 wherein the first membrane is a cationic membrane and said certain anolyte ions are positive charged ions.

9. The fuel cell set forth in claim 6 wherein the first membrane is an anionic membrane and said certain anolyte ions are negative charged ions.

10. The fuel cell set forth in claim 6 wherein the membranes are cationic membranes and said certain anolyte ions and ionolyte ions are positive charged ions.

11. A battery comprising a plurality of like fuel cells, each comprising an anode section including an anode chamber, an anode fuel supply in the anode chamber, and anode terminal connected with the fuel supply and accessible at the exterior of the chamber, anolyte inlet and outlet ports communicating with the chamber and an anolyte within the chamber, a cathode section including a cathode chamber, an electron distributor means in the cathode chamber, a cathode terminal connected with the distributing means and accessible at the exterior of the chamber, catholyte inlet and outlet ports communicating with the chamber and a catholyte within the chamber, an ion exchange section between the anode and cathode sections including an ion exchange chamber, ionolyte inlet and outlet ports communicating with the ion exchange chamber and an ionolyte within the chamber, a first ion transfer membrane between the anode and ion exchange sections, a second ion transfer membrane between the ion exchange and cathode sections and a support system comprising an external electric circuit connected with and between the anode and cathode terminals conducting electrons from the anode sections and delivering electrons to the cathode sections; anolyte, ionolyte and catholyte supply tanks spaced from the battery, elongate anolyte, ionolyte and catholyte delivery lines extending from the inlet port of each anode, ion exchange and cathode section in the battery to related anolyte, ionolyte and catholyte supply tanks and through which anolyte, ionolyte and catholyte flow from said supply tanks to the cell sections, anolyte, ionolyte and catholyte receiving means spaced from the battery and elongate anolyte, ionolyte and catholyte discharge lines extending from each anode, ion exchange and cathode section to its related anolyte, ionolyte and catholyte receiving means and through which anolyte, ionolyte and catholyte flow from their related cell sections to related receiving means, said delivery and discharge lines are made of dielectric material and the ratio of diameter to length thereof is such that the electric resistance afforded by the fluid therein stops the flow of shunt currents therethrough and between those cell sections with which the lines communicate.

12. The battery set forth in claim 11 wherein the several delivery and discharge lines are heat exchangers exposed to the ambient atmosphere and function to maintain the temperature of the fluids flowing therethrough at close to ambient temperature.

13. The battery set forth in claim 12 which further includes return means to conduct anolyte, ionolyte and catholyte from their related receiving means to their related supply tanks, said return means includes elongate return lines extending between and communicating with related receiving means and supply tanks and through which the anolyte, ionolyte and catholyte flow from said receiving means to said supply tanks.

14. The battery set forth in claim 12 wherein the supply tanks are on planes positioned above the planes on which the cells occur whereby the fluids therein are gravity fed into their related cell chambers.

15. The battery set forth in claim 13 wherein the supply tanks are on planes positioned above the planes on which the cells occur whereby the fluids therein are gravity fed into their related cell chambers.

16. The battery set forth in claim 15 wherein the receiver means includes vertically shiftable fluid receiving receptacles normally positioned below the plane of the battery cells whereby fluid from the cells flows by gravity from the cells to the receptacles and which are intermittently elevated above the plane on which the supply tanks are positioned to drain fluids from the receptacles into their related tanks.

17. The battery set forth in claim 15 wherein the return means includes electric pumps in the return lines moving the liquids therein from their related receiver means to their related supply tanks.

* * * * *